Jan. 18, 1944.     R. G. THOMPSON     2,339,526
CURRENT REGULATING SYSTEM
Filed April 17, 1941     5 Sheets-Sheet 1
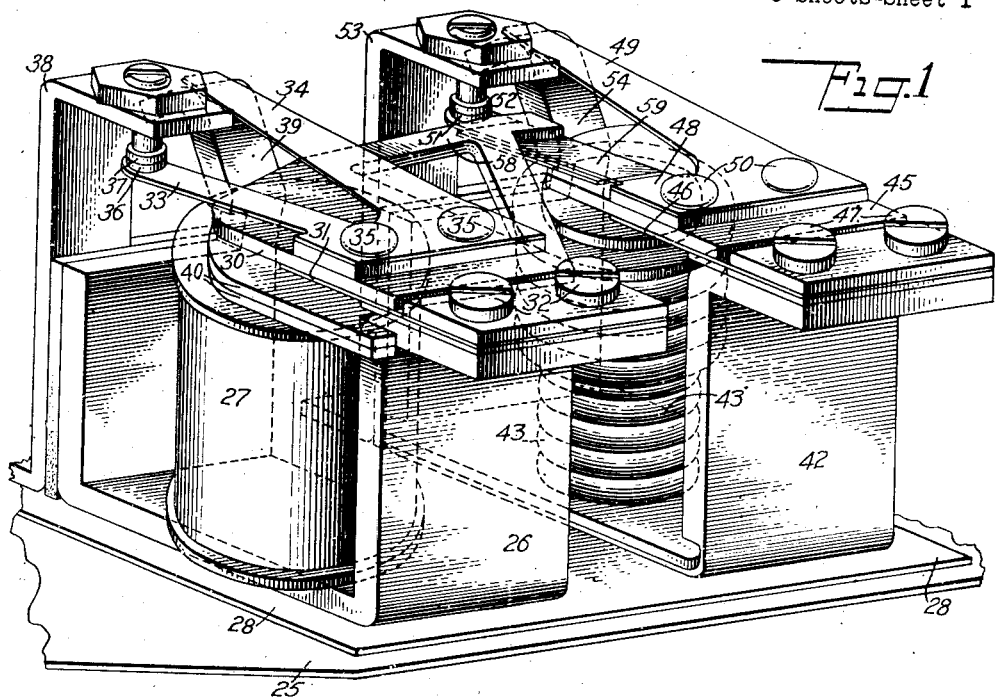
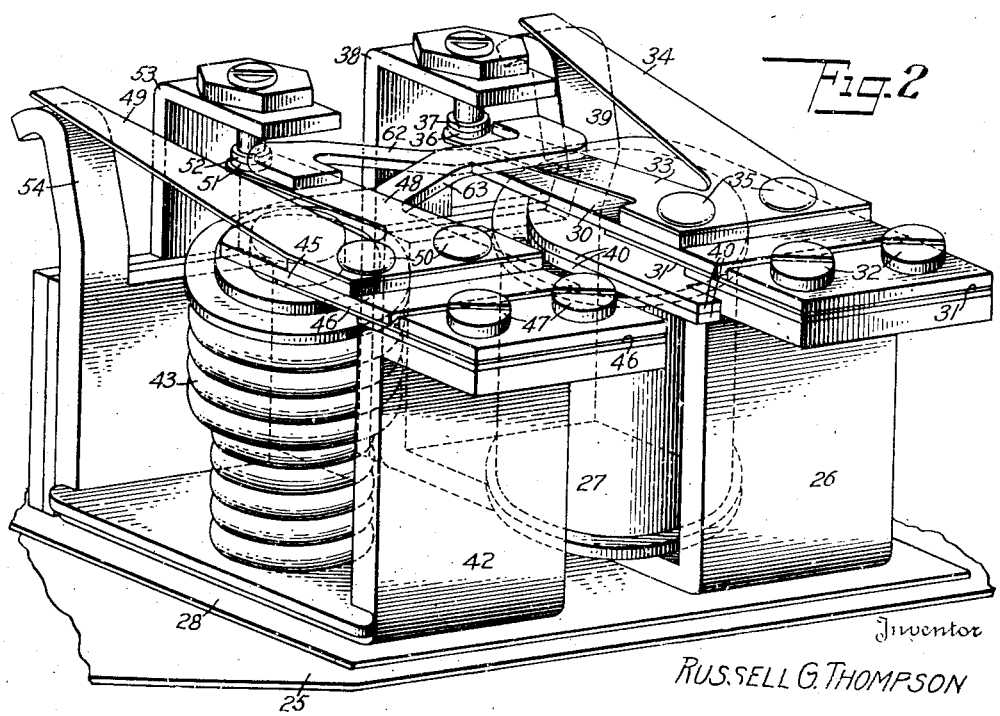
Inventor
RUSSELL G. THOMPSON
By Edwin O. Blodgett
Attorney Jan. 18, 1944.     R. G. THOMPSON     2,339,526
CURRENT REGULATING SYSTEM
Filed April 17, 1941     5 Sheets-Sheet 2

Inventor
RUSSELL G. THOMPSON
By Edwin O. Blodgett
Attorney

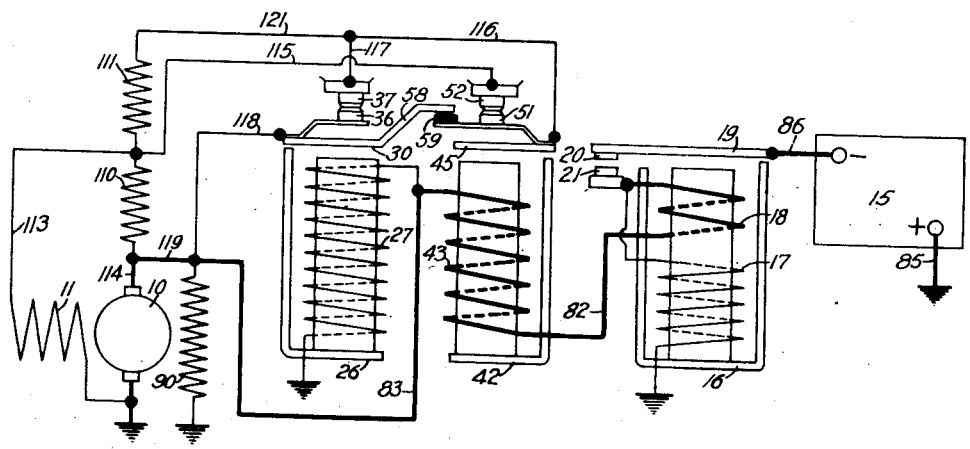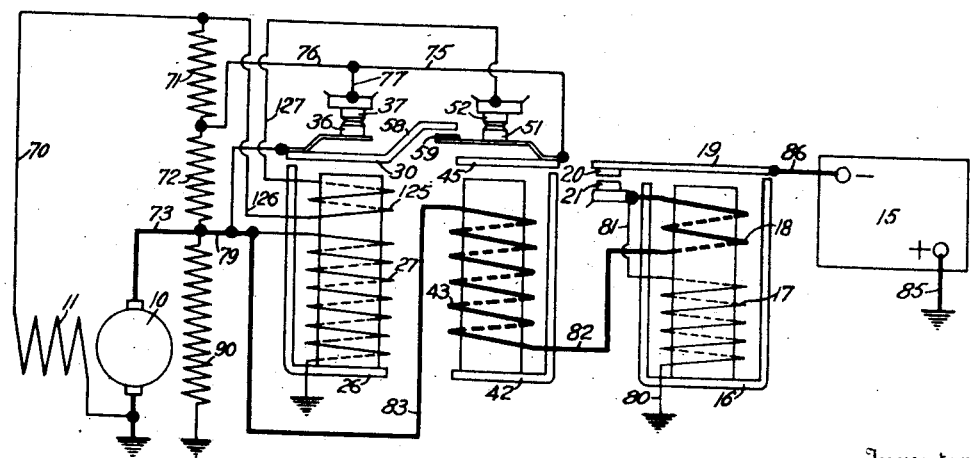

Jan. 18, 1944.  R. G. THOMPSON  2,339,526
CURRENT REGULATING SYSTEM
Filed April 17, 1941  5 Sheets-Sheet 4

Inventor
RUSSELL G. THOMPSON
By Edwin O. Blodgett
Attorney

Jan. 18, 1944. R. G. THOMPSON 2,339,526
CURRENT REGULATING SYSTEM
Filed April 17, 1941 5 Sheets-Sheet 5

Inventor
RUSSELL G. THOMPSON
By Edwin O. Blodgett
Attorney

Patented Jan. 18, 1944

2,339,526

UNITED STATES PATENT OFFICE 2,339,526

CURRENT REGULATING SYSTEM

Russell G. Thompson, Elmira, N. Y.

Application April 17, 1941, Serial No. 389,034

16 Claims. (Cl. 171—223)

This invention relates to electric regulating systems, and more particularly to systems for regulating the output of variable speed generators.

In motor operated vehicles such as automobiles, a variable speed generator is ordinarily provided to charge a storage battery supplying power for operation of the various electrical equipment, and this generator is usually of the shunt field type with a regulating system arranged to insert resistance into the field circuit at high generator speeds to protect the generator and battery against damage from excessive voltage and current. In the usual form of regulating systems of this type, electrical contacts are employed which are normally closed to shunt the resistance in the generator field and are opened by electromagnetic devices which are operated when the voltage or current of the generator exceeds predetermined values. The generator voltage and current is quickly reduced by the opening of these contacts which in turn affect the electromagnetic devices to again close the contacts. At higher speeds of the vehicle this cycle of operation is repeated at a high rate of speed to provide substantially a vibrating operation of the contacts.

It is the usual practice to provide a single resistance in series with the generator field and to normally shunt this resistance by two sets of normally closed contacts arranged in series. One set of these contacts is opened by an armature of a voltage magnet which is attracted when the generator voltage exceeds a predetermined value, and the other set of contacts is opened by an armature of a current magnet which is attracted when the output current of the generator exceeds a predetermined value. Thus, each set of contacts ordinarily operates individually and the opening of either set is effective to provide the full reduction in field current. In order to afford proper regulation, a considerable reduction in the field current is required, and accordingly the opening of either of these sets of contacts ordinarily interrupts sufficient current to alone cause considerable damage to the contact surfaces during rapid operation. In addition, it will also be clear that the abrupt reduction of the field current caused by the opening of these contacts results in a considerable induced electromotive force in the field windings, and this adds to the damage of the contacts by causing a considerable arc as the contacts open. Thus it has been found that when a single field resistance is shunted by such sets of contacts the opening of these contacts continuously at a high rate of speed soon causes the contact surfaces to be coated or pitted and the contacts often stick or weld together thereby causing serious damage to the generator and other electrical equipment, and frequently destroying the generator, battery, and regulator, in which case the automobile is inoperative.

In view of the above and other considerations, it is an object of the present invention to provide an improved regulating system wherein these difficulties are overcome by a simple and yet highly effective arrangement wherein either a divided field resistance or a plurality of resistances are employed with a plurality of sets of contacts for shunting different portions of the divided resistance or different combinations of resistances. In this manner the load or the total power to be controlled is distributed or apportioned between the different sets of contacts so that the load controlled by each set of contacts is reduced to a degree which does not cause sufficient arcing or heating to damage the contact surfaces, thereby avoiding the sticking or welding together of the contacts, and preventing the destruction of the generator, battery and regulator.

A further object of the present invention is to provide an improved regulating system of the type described above wherein the load on the regulator contacts is further reduced by an arrangement of a resistance for dissipating the energy stored in the field upon opening of the regulator contacts, which resitsance is so arranged that current through it does not add to the field current passing through the contacts and thereby further lengthens the effective life of the contacts.

Other objects, purposes and characteristic features of the present invention will appear as the description thereof progresses, during which references will be made to the accompanying drawings, in which:

Fig. 1 is a perspective view showing certain regulating apparatus having one form of mechanical coacting means between the voltage and current relays.

Fig. 2 is a perspective view showing a different form of mechanical coacting means between the voltage and current relays.

Fig. 5 is a diagrammatic view showing another modified form of regulating system applied to the battery charging generator shown in Fig. 3 and employing the mechanical coacting means shown in Fig. 1.

Fig. 6 is a diagrammatic view showing still another modified form of regulating system applied to the battery charging generator shown in Fig. 3 and employing the mechanical coacting means shown in Fig. 1 with an additional winding on the voltage relay.

Figure 3:
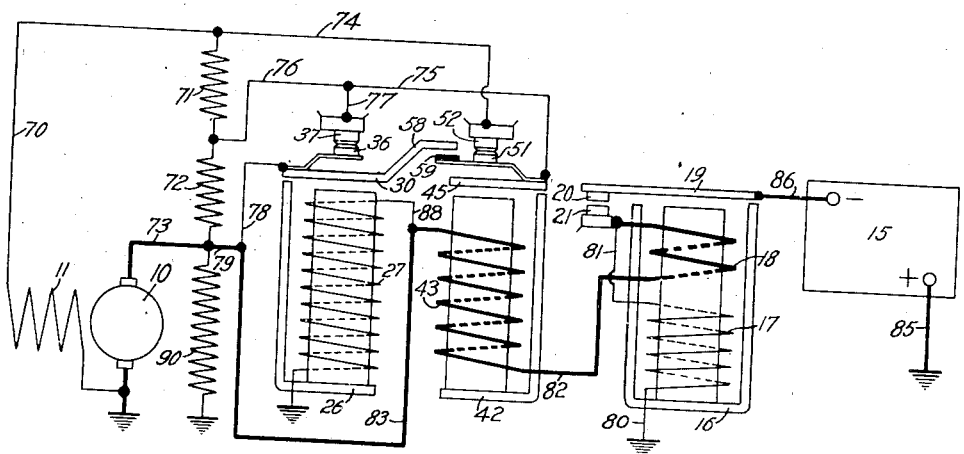
Fig. 3 is a diagrammatic view showing one form of regulating system employing the mechanical coacting means shown in Fig. 1 and shown in connection with a generator for charging a storage battery.

In the drawings, like reference characters refer to the same parts throughout the several views, and in Figs. 3 to 9, inclusive, the apparatus is shown in a diagrammatic manner to make the invention easily understood, and no attempt has been made to show the particular construction preferably employed in practice.

Figure 7:
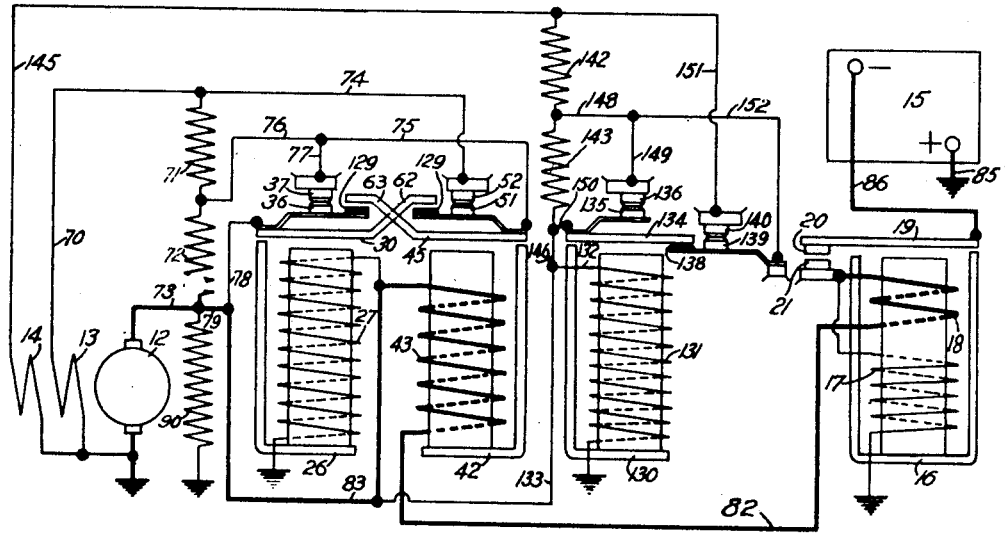
Fig. 7 is a diagrammatic view of a form of regulating system employing the mechanical coacting means shown in Fig. 2 and applied to a battery charging generator of higher capacity.
Figure 8:
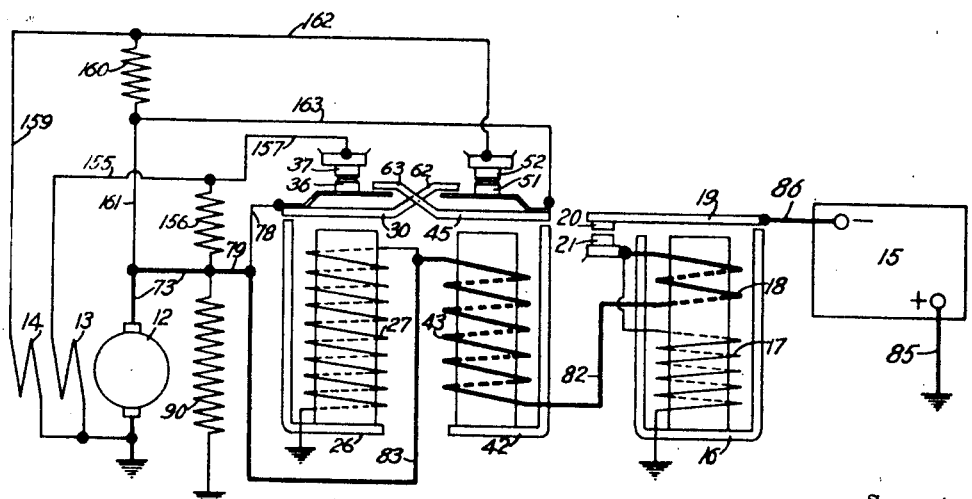
Fig. 8 is a diagrammatic view showing a modified form of regulating system also employing the mechanical coacting means shown in Fig. 2 and applied to the battery charging generator shown in Fig. 7.
Figure 9:
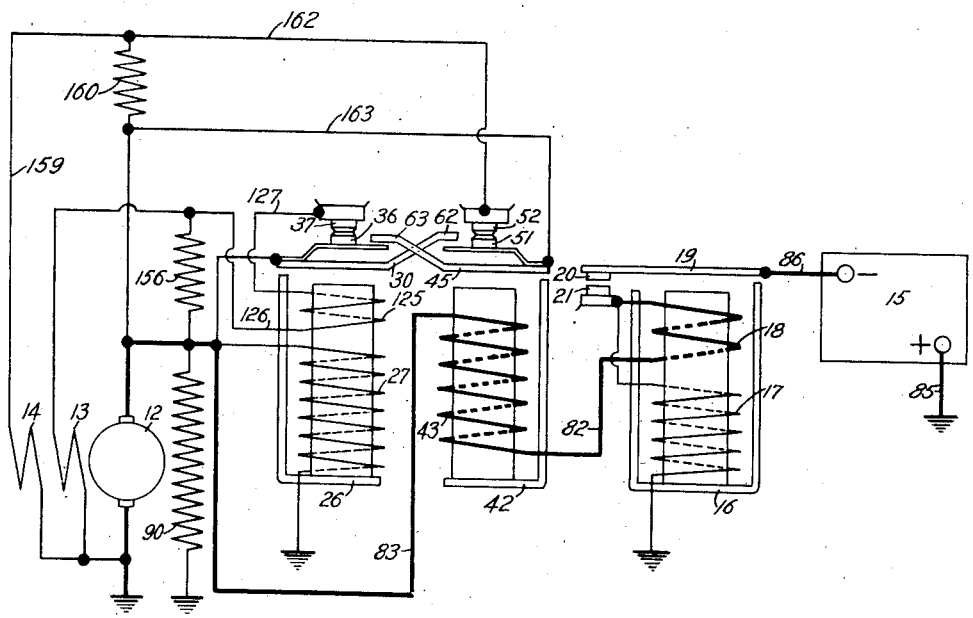
Fig. 9 is a diagrammatic view showing a modified form of the regulating system shown in Fig. 8.

In Figs. 3 to 6, inclusive, a generator of the usual size such as used in pleasure cars and the like is shown conventionally as comprising an armature 10 and field windings 11, and in Figs. 7, 8 and 9, a generator of higher capacity such as may be used in commercial vehicles is shown as comprising an armature 12 having two parallel field windings 13 and 14. Each of these generators may be driven by the engine of the vehicle such as an automobile, truck, bus, airplane, or the like, or by the axle of a railway car, to generate power for charging a storage battery 15 which may be mounted on the vehicle to supply power for operating lights, fans, radios, air-conditioning apparatus, and other electrical apparatus which may be used on the vehicle. It will also be noted in the drawings that the positive or (+) terminal of the generator and battery are connected to ground which may be the frame of the vehicle. However, it is of course clear that the negative or (−) terminals of the battery and generator could be connected to ground or the frame of the vehicle rather than the (+) terminal, or neither of these terminals could be connected to ground and separate insulated conductors could be used.

In the illustrated forms of the present regulating system, the regulating apparatus includes a voltage relay, a current relay, and the usual cut-out or reverse current relay. This cut-out or reverse current relay functions entirely in the usual manner in the present regulating system, and as any well known construction may be used, this portion of the apparatus has only been shown diagrammatically in Figs. 3 to 9, inclusive. The diagrammatically illustrated form of this relay comprises a stationary magnetic structure 16 with winding 17 and an oppositely arranged heavier winding 18 for actuating an armature 19. The armature 19 is acted upon by the usual spring means (not shown) which normally holds the armature in its upper or illustrated position wherein a contact 20 on the armature is disengaged from a stationary contact 21. This armature spring means is adjusted so that when current above a predetermined value flows through the windings 17 and 18, the armature 19 will be attracted downwardly to engage contacts 20 and 21.

In Figs. 1 and 2, the mechanical construction of a voltage relay and a current relay is shown as an example of the construction which may be used in the present regulating system, and the detail construction of these parts has been shown more particularly to illustrate certain forms of mechanical devices for affording coaction between the voltage and current relays in accordance with certain forms of the present invention. Accordingly it will be understood that the present invention is not limited to the particular mechanical details of construction shown in Fig. 1 and Fig. 2 and that various other well known constructions may be used as well.

In Figs. 1 and 2, the voltage and current relays are mounted on a common base 25 which may have flanged sides (not shown) to house certain resistors used in the system and the cut-out relay may also be mounted on this base. The general construction of the voltage and current relays may be substantially the same in Fig. 1 and in Fig. 2 although they are shown as mounted in reversed relative positions on the base 25 in the two views. The voltage relay comprises a stationary yoke 26 of magnetic material with an electromagnet mounted thereon which comprises winding 27 surrounding a central iron core. The yoke 26 and electromagnet are secured to the base 25 but electrically insulated therefrom by the usual arrangement including an insulating plate 28.

A tractive armature 30 is provided to complete the magnetic circuit between the upper end of the core of the electromagnet and the upper end of the yoke 26. The armature 30 is provided with a hinge connection to the yoke 26 by a flexible steel strip 31 secured to the lower surface of the armature and also secured at 32 to the outwardly bent end of the yoke 26. A bifurcated spring steel strip having arms 33 and 34 is also mounted at 35 on the armature 30 to move therewith. A contact 36 is provided at the end of arm 33 which normally engages a stationary contact 37 adjustably mounted on an upstanding bracket 38 which is in turn mounted in insulated relation on an extension of the yoke 26.

The end of the spring arm 34 engages a bendable upward extension 39 of the yoke 26, and the spring tension of the arm thus reacts against this extension to resiliently hold the armature 30 in its upper position wherein contact 36 engages contact 37. Thus the normal position of the armature 30 may be varied by adjusting the stationary contact 37 and the effective force of the spring arm 34 may be adjusted by bending the extension 39. In this manner, the voltage relay may be adjusted so that the armature is attracted downwardly toward the upper end of the core of the electromagnet when the current in windings 27 exceeds a predetermined critical value. It may also be found desirable to provide magnetic shunt strips 40 as shown in order to obtain the desired operating characteristics of the relay.

The mechanical construction of the current relay is generally the same as the voltage relay and comprises a magnetic yoke 42 and electromagnet having winding 43 of relatively heavy wire surrounding a central iron core and mounted in insulated relation on the base 25 by the plate 28. A tractive armature 45 is also provided on the current relay and is hinged by a flexible steel strip 46 secured at 47 to an outward extension of the yoke 42. A bifurcated spring member having arms 48 and 49 is also secured at 50 to the armature 45 to move therewith, and the end of the arm 48 is provided with a contact 51 normally engaging a stationary contact 52 adjustably mounted on a bracket 53 secured in insulated relation to an extension of the yoke 42.

The end of the spring arm 49 of the current relay also engages a bendable upward extension 54 of the yoke 42 to resiliently hold the armature 45 in its upper position wherein contact 51 engages contact 52. Likewise, the stationary contact 52 may be adjusted to afford slight variation in the normal position of the armature 45, and the effective force of the spring arm 49 may be varied by bending the extension 54 in order that the armature may be attracted downwardly toward the upper end of the core of the electromagnet when the current in winding 43 exceeds a predetermined critical value.

The mechanical coacting means between the voltage and current relays is arranged in accordance with the form shown in Fig. 1 to operate contact 36 as well as contact 51 by movement of armature 30 of the voltage relay but to afford operation of contact 51 only by movement of armature 45 of the current relay. This means is shown as comprising an integral lateral extension 58 on the armature 30 of the voltage relay, and the end of this extension overlies the spring arm 48 of the current relay. The end of the extension 58 may be insulated from the spring arm 48 in some instances by any suitable means such as a strip 59 of insulating material secured to the upper surface of the spring arm. This arrangement then provides that when armature 30 of the voltage relay is attracted downwardly, contact 36 will be disengaged from contact 37 and the extension 58 will operate on the spring arm 48 to also disengage contact 51 from contact 52. The stationary contacts 37 and 52 may be adjusted so that both sets of contacts open and close simultaneously or they may be adjusted so that the two sets open and close consecutively as will be discussed later. It will also be clear that the extension 58 has only a one-way operative connection with the arm 48 so that the attraction of the armature 45 of the current relay will disengage contact 51 from contact 52 without moving contact 36 of the voltage relay. Although the relative position of the voltage and current relays is reversed in Fig. 2, the construction thereof may be generally the same as shown in Fig. 1 and the same reference numerals have been applied to the corresponding parts in the two views. However the mechanical coacting means between the voltage and current relays is arranged in accordance with the form shown in Fig. 2 to operate both contacts 36 and 51 by movement of either armature 30 of the voltage relay or armature 45 of the current relay. This means is shown as comprising an integral lateral extension 62 on armature 30 and a similar but oppositely disposed lateral extension 63 on armature 45. The extension 62 is offset laterally as shown as that the end thereof overlies the spring arm 48 and the extension 63 is offset in a similar manner so that its end portion overlies the spring arm 33.

This arrangement shown in Fig. 2 then provides that when armature 30 of the voltage relay is attracted, contact 36 will be disengaged from contact 37 and the extension 62 will operate on arm 48 to disengage contact 51 from contact 52. Likewise when armature 45 of the current relay is attracted, contact 51 will be disengaged from contact 52 and the extension 63 will operate on arm 33 to disengage contact 36 from contact 37. The stationary contacts 37 and 52 may also be adjusted in this form so that both sets of contacts open and close simultaneously upon the attraction of either armature, or they may be adjusted so that the two sets open and close consecutively as will also be discussed later. In some systems, such as shown in Fig. 7 for example, insulation may be required between the extensions 62 and 63 and the arms 48 and 33, and in these instances insulating strips, such as 59 shown in Fig. 1, may be provided on the arms 48 and 33.

In the various forms of the present regulating system shown in Figs. 3 to 9, inclusive, the above described apparatus may be used, and although the apparatus is shown in a diagrammatic manner, the same reference characters have been applied to the corresponding parts. Referring to Fig. 3, the generator windings 11 comprise a shunt field wherein one end is connected to the lower or (+) terminal of the armature 10 and the other end is connected by wire 70 through current limiting resistance comprising sections 71 and 72 to the upper or (—) terminal of the armature 10 by wire 73. However, at low speeds of the generator, wherein the output current and voltage do not exceed predetermined values, the resistances 71 and 72 are not effective to limit the current in the shunt field 11 by reason of shunt circuits around these resistances completed through contacts 51—52 and 36—37. In other words, a shunt circuit is completed around the resistance 71 through wire 74, contacts 52—51, and wires 75 and 76, and a similar shunt circuit is completed around resistance 72 through wires 76 and 77, contacts 37—36 and wires 78 and 79.

Under these conditions, full voltage is applied to the shunt field 11 and the armature current of the generator flows from the lower terminal of the armature through the ground circuit, wire 80, upward through the lower winding 17 and by wire 81 downward through the reversely arranged winding 18 of the cut-out relay, wire 82, winding 43, and wires 83, 79 and 73 to the upper terminal of the armature 10. This relative direction of current through the windings 17 and 18 produces a cumulative magnetic flux which attracts the armature 19 to engage contacts 20 and 21. The closing of contacts 20—21 allows battery charging current to flow from the generator through the ground circuit to the battery by wire 85 and from the battery by wire 86, armature 19, contacts 20—21, downward through winding 18, and back to the upper terminal of the armature 10 over the circuit previously traced. Thus the battery charging current flows through winding 18 in the same direction after contacts 20—21 close as in the circuit previously traced with these contacts open, and accordingly the armature 19 is retained in its attracted position.

The winding 27 of the voltage relay is connected across the output terminals of the armature 10, or that is, the lower end of this winding is connected to ground while the upper end is connected by wires 88, 83, 79 and 73 to the upper terminal of the generator. Thus the current in the winding 27 is proportional to the output voltage of the armature 10, and when the speed of the generator is increased to a point where this voltage exceeds a predetermined value, the current in the winding 27 provides sufficient magnetic force to attract the armature 30 against the force of its spring.

The form of the invention illustrated in Fig. 3 employs the mechanical coacting means between the voltage and current relays shown in Fig. 1, and accordingly the attraction or downward movement of the armature 30 not only opens contacts 36—37 but also opens contacts 51—52 by reason of the extension 58 on armature 30. Thus, the attraction of the armature 30 will open the shunt circuit around both of the resistances 71 and 72 so that these resistances will be in series in the energizing circuit of the shunt field 11 and thereby reduce the current through the field to a value which is effective to reduce the output voltage of the generator below the safe working voltage for the various parts of the electrical system. This reduced voltage of the generator reduces the current in winding 27 to an extent which releases the armature 30 and again allows the contacts 36—37 and 51—52 to close, and if the generator is still being operated at a sufficiently high rate of speed to cause the output voltage to be excessive, it will be clear that armature 30 will again be attracted to open the shunt circuit around resistances 71 and 72. This cycle of operation of the armature 30 will be repeated as long as the speed of the generator is sufficiently high to tend to produce an excess voltage, and the rate at which this cycle is repeated will increase as the tendency for the voltage of the generator to increase becomes greater to thereby maintain a substantially constant output voltage of the generator.

It will be clear that the current in the shunt field 11 reaches a maximum value just before the contacts 36—37 and 51—52 open, and after these contacts have opened this field current is reduced to a minimum value. This change in current in the field is sufficient to produce a considerable induced electromotive force, and this energy stored in the field must be dissipated as the normal energization thereof is reduced. For this purpose, a non-inductive resistance 90 is provided for dissipating this field energy as the contacts 36—37 and 51—52 open.

In accordance with the present invention, this resistance 90 is connected in the circuit so that the normal current passing through it does not pass through the contacts 36—37 and 51—52 and accordingly does not increase the load on these contacts. Thus, the resistance 90 is connected as shown so that when the regular contacts are closed, it is in shunt with the field 11 and when these contacts open, the resistance 90 is connected around the field through the resistances 71 and 72 in series. In this manner, the resistance 90 is effective to dissipate the energy stored in the field 11 in combination with the resistances 71 and 72 and yet the normal current flowing through the resistance 90 from the armature 10 does not pass through the contacts 36—37 and 51—52 as is the case in most regulating systems.

It has been found that the combined values of resistances 71 and 72 must be considerable in order to sufficiently reduce the generator voltage at high speeds, and with the ordinary arrangement wherein sets of regulator contacts are arranged in series to shunt a resistance equal to the combined values of the present resistances 71 and 72, the heating or arcing when one of these contacts open is sufficient to seriously damage the contact surfaces and on repeated operation, it has been found that contacts arranged in this manner will stick or weld together and cause damage to the electrical equipment as previously pointed out.

Inasmuch as the load on the regulator contacts is proportional to the value of the resistance connected in parallel therewith, it will be clear that the present arrangement greatly reduces the load on the contacts 36—37 and 51—52 by the provision of a divided resistance wherein the sections 71 and 72 are each shunted by an individual set of contacts. Thus, only a portion 71 of the total field current limiting resistance is controlled by the contacts 51—52 and the remaining portion 72 of this total resistance is controlled by the contacts 36—37, and through coaction between the voltage and current relays provided by the interconnecting means 58—59, both of these sets of contacts are open by the armature 30 when the voltage of the generator becomes excessive and the total resistance is inserted in the field circuit with the load divided or apportioned between two sets of contacts.

With this arrangement, both sets of contacts may be operated simultaneously by the armature 30 or one set of contacts may be operated slightly in advance of the operation of the other set. If both sets of contacts operate simultaneously or if no attempt is made to obtain operation of the two sets at different intervals, the two resistances 71 and 72 may be of equal values. However, if the stationary contacts 37 and 52 (see Fig. 1) are adjusted as previously described so that one set of contacts opens before the other, the resistance associated with the set of contacts which opens first should be a lesser value than the other resistance in order that the loads on the two sets of contacts may be more evenly distributed.

In the present system, the battery 15 may become discharged to such an extent that the charging current supplied by the generator will become excessive without allowing the output voltage of the generator to reach a value which causes the armature 30 to be attracted. In this instance, this excessive current will cause the armature 45 to be attracted, thereby opening contacts 51—52 to remove the shunt around the resistance 71 and thereby cause a reduction in the field current. In most instances, it has been found that the charging current of the generator will be reduced sufficiently to prevent damage by inserting only the resistance 71 in the field circuit, and accordingly, the armature 45 is arranged in Fig. 3 to operate only contacts 51—52. However, if desired, it will be clear that the mechanical coacting means between the voltage and current relays shown in Fig. 2 could be employed in the system shown in Fig. 3 and in this case, the armature 45 would be provided with extension 63 (see Fig. 2) whereby attraction of the armature 45 would open contacts 36—37 as well as contacts 51—52 to insert both of the resistances 71 and 72 into the field circuit by the operation of the admature 45 alone.

Figure 4:
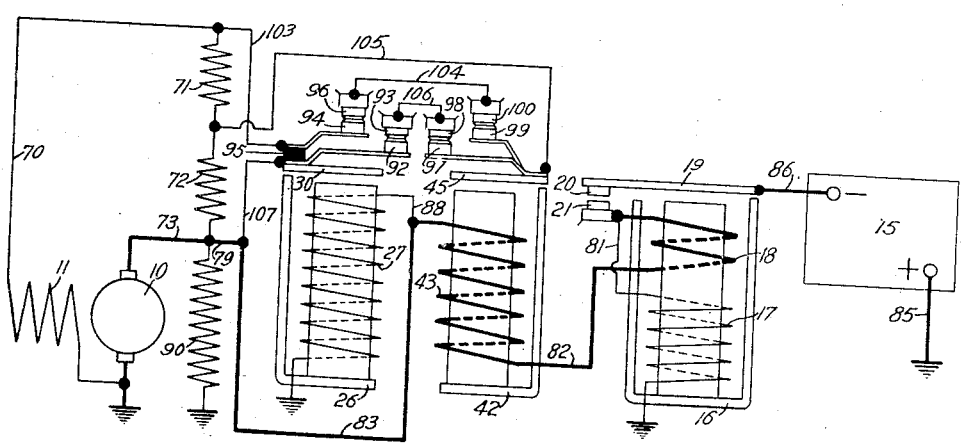
Fig. 4 is a diagrammatic view showing a modified arrangement of the regulating system shown in Fig. 3 wherein two sets of contacts are provided on the voltage and current relays and no mechanical coacting means are employed.

The apparatus used in the modified form of the regulating system shown in Fig. 4 is generally similar to the apparatus previously described in connection with Figs. 1 and 2 with the exception that no mechanical interconnection is employed between the voltage and current relays in the form shown in Fig. 4. In this form, a double set of contacts is provided on the voltage relay as well as on the current relay, and each of the two sections 71 and 72 of the current limiting field resistance is normally shunted by one set of contacts on the voltage relay arranged in series with one set of contacts on the current relay.

In Fig. 4, a contact 92 is mounted on the armature 30 of the voltage relay to normally engage a stationary contact 93, and a second contact 94 is also mounted on the armature 30 in insulated relation to the contact 92 by an insulating member 95 and this contact 94 normally engages a stationary contact 96. The armature 45 of the current relay is provided with a contact 97 normally engaging a stationary contact 98, and a second contact 99 is also provided on the armature 45 which may be electrically joined with the contact 97, and this contact 99 normally engages a stationary contact 100. With this arrangement, the resistance 71 is normally shunted by a circuit including wire 103, contacts 94—96, wire 104, contacts 100—99 and wire 105. Likewise resistance 72 is normally shunted by a circuit including wire 105, contacts 97—98, wire 106, contacts 93—92, and wires 107 and 79.

This arrangement shown in Fig. 4 then operates to reduce the generator voltage by removing the shunt around both of the resistances 71 and 72 whenever an excessive generator voltage causes armature 30 to be attracted, or whenever an excessive current causes armature 45 to be attracted. The two sets of contacts associated with each armature may be arranged to open simultaneously or sequentially, and in case they are arranged to open simultaneously the resistances 71 and 72 may be the same values, but if they are arranged to open sequentially, the resistances associated with the set of contacts which opens first should have a smaller value than the other resistance as explained in connection with Fig. 3. For example, if the contacts 92—93 are arranged to open before contacts 94—96 and contacts 97—98 are arranged to open before contacts 99—100, then the resistance 72 should be of less value than the resistance 71 in order to equalize the load on all the sets of contacts. From the above, it will be clear that the form of the present invention shown in Fig. 4 provides substantially the same advantages as the form shown in Fig. 3 in that the contact load in controlling the field energization is distributed between a plurality of sets of contacts thereby eliminating undue arcing and heating of the contact surfaces.

In the form of regulating system shown in Fig. 5, the apparatus employed may be the same as described in connection with Fig. 3, but the energizing circuit for the field 11 in Fig. 5 includes resistances 110 and 111 which are arranged in a different manner than the resistances 71 and 72 in Fig. 3. The resistance 110 is connected in the energizing circuit for the field 11 by wires 113 and 114, but when the output voltage and current of the generator are not excessive, the resistance 110 is shunted by a circuit including wire 115, contacts 52—51, wires 116 and 117, contacts 37—36 and wires 118 and 119. Under this condition, it will be clear that the resistance 110 is ineffective to limit the field current so that full armature voltage is applied thereto.

In Fig. 5, the mechanical coacting means between the voltage and current relays shown in Fig. 1 is employed, and in this form it is preferable that the stationary contacts 37 and 52 (see Fig. 1) should be adjusted so that contacts 51—52 open first upon attraction of the armature 30 of the voltage relay. Thus when the generator voltage reaches a value which causes attraction of armature 30, contacts 51—52 will open first to interrupt the previously traced shunt circuit around resistance 110 and connect resistance 111 in multiple with resistance 110 over a circuit including wires 121 and 117, contacts 37—36 and wires 118 and 119. In this interval when the contacts 51—52 open and the contacts 36—37 are still closed, a partial reduction in the field current occurs due to the insertion of resistance in series therewith equal to the total value of resistances 110 and 111 in multiple, which value is of course less than the value of the smaller of the two resistances.

When the contacts 36—37 open upon further movement of armature 30, resistance 110 only is included in the field circuit and accordingly the field current is reduced to a minimum value. In this manner, the arrangement shown in Fig. 5 provides a partial reduction in the field current upon the opening of contacts 51—52 and a further reduction upon the subsequent opening of contacts 36—37, thereby distributing or apportioning the load between these two sets of contacts.

In the system shown in Fig. 5, it will be clear that when the output current of the generator becomes excessive without the voltage being sufficiently high to attract armature 30, the armature 45 of the current relay only will be attracted, thereby providing a partial reduction in the field current by establishing the previously traced circuit wherein resistances 110 and 111 are connected in multiple in the field circuit. However, armature 45 could be provided with the extension 63 shown in Fig. 2 if it is found that a further reduction in the field current is required under this condition. In this case, adjustments could be made so that the attraction of armature 45 only would open contacts 51—52 and subsequently open contacts 36—37 through the extension 63 thereby reducing the field curent in steps the same as operation of the armature 30 and affording the same distribution of the load between the two sets of contacts.

The regulating system shown in Fig. 6 is generally the same as that shown in Fig. 3 except that an additional winding 125 has been provided on the voltage relay. This winding 125 is shown as connected in series with the shunt circuit around resistance 71 by wires 126 and 127, and the winding in this instance is so arranged that current in this shunt circuit produces magnetomotive force opposing the magnetomotive force produced by current in winding 27. The winding 27 may then have a greater number of ampere turns in Fig. 6 than in Fig. 3 so that normally with contacts 36—37 and 51—52 closed, the effect of winding 125 will be offset and armature 30 will be attracted when the generator voltage reaches the same value as in the form shown in Fig. 1.

With this arrangement, it will be clear that when the output current of the generator becomes excessive and the voltage is not excessive, armature 45 will be attracted to open contacts 51—52, thereby reducing the field current and interrupting the current in winding 125. Upon deenergization of winding 125, the full effect of the magnetomotive force produced by the current in winding 27 will be effective to attract armature 30, thereby causing this armature to be attracted and open contacts 36—37 if the voltage has not been sufficiently reduced by the opening of contacts 51—52. The stationary contacts 37 and 52 may also be adjusted in this system so that the attraction of armature 30 will open contacts 51—52 before opening contacts 36—37, thereby deenergizing winding 125 and allowing the full force of winding 27 to be effective to insure quick and positive opening of contacts 36—37 by the further movement of armature 30.

It will be clear that the winding 125 may be connected into the field circuit in various other ways than shown in Fig. 6. For example, the winding 125 could be connected in series with the shunt circuit around resistance 72 and arranged so that its magnetomotive force would add to the magnetomotive force of winding 27, in which case the opening of contacts 36—37 would provide a greater reduction in the magnetic flux in the voltage relay as armature 30 reaches its fully attracted position thereby permitting it to be again released by a smaller reduction in generator voltage. On the other hand, winding 125 could be connected in series with the shunt circuit around resistance 72 but arranged to differentially oppose the effect of winding 27 as in Fig. 6. In this instance, adjustments should be made so that contacts 36—37 would be opened by armature 30 before contacts 51—52, thereby deenergizing winding 125 as contacts 36—37 open to allow the full effect of winding 27 to be effective to insure quick and positive opening of contacts 51—52 by the latter part of the movement of armature 30.

A single shunt field winding is shown on the generator in Figs. 3, 4, 5 and 6, but it is to be understood that the generator field may if desired be divided into a plurality of multiple field windings, each controlled individually by external regulator circuits. Although it is obvious that the regulating apparatus and control circuits shown in Figs. 3 to 6, inclusive, could be duplicated for each of such multiple fields, it is not always necessary to provide all of this additional regulating apparatus for generators having multiple field windings as will appear from the following description of the systems shown in Figs. 7, 8 and 9.

In Fig. 7, the higher capacity generator is indicated as comprising an armature 12 having two parallel field windings 13 and 14 as previously pointed out, and in this system, the field winding 13 is energized by the same general arrangement shown in Fig. 3 which includes the current limiting resistances 71 and 72 with associated contacts 51—52 and 36—37 on the current and voltage relays. However, these voltage and current relays in Fig. 7 have been shown as provided with the mechanical coacting devices shown in Fig. 2 which include armature extensions 62 and 63 which operate contacts 36 and 51, respectively, through insulating members 129. It will also be noted that a separate voltage relay has been provided in the form shown in Fig. 7 for individually controlling the energization of the other field winding 14. This second voltage relay may be generally of the same construction including a magnetic structure 130 having a winding 131, one end of which is connected to ground and the other end connected by wires 132, 133, 83, 79 and 73 to the upper terminal of the armature 12. In this manner, the winding 131 is energized in multiple with the winding 27 of the other voltage relay. An armature 134 on the second voltage relay is arranged in the same manner as the armature 30 and this armature 134 carries a contact 135 which normally engages a stationary contact 136. In addition, an extending end of the armature 134 is operatively connected by an insulating member 138 to operate a contact 139 which normally engages a stationary contact 140.

A current limiting resistance is included in the energizing circuit for the field winding 14 which is divided into two sections 142 and 143. These two resistances are connected in series with field winding 14 through wires 145, 146, 133, 83, 79 and 73. The contacts 135—136 are then connected around the resistance 143 by wires 148, 149 and 150, and likewise the contacts 139—140 are connected around the resistance 142 by wires 151, 152 and 148.

From the above description of the form of the present invention shown in Fig. 7, it will be clear that the field winding 13 is controlled by the current and voltage relays to obtain partial regulation of the output voltage of the generator in the same manner as described in connection with Fig. 3 wherein the load is distributed between two sets of contacts 36—37 and 51—52 to thereby eliminate the damage to the contact surfaces by undue arcing and heating. In this form the output of the generator is further controlled by additional field current limiting resistances 142 and 143 arranged in the energizing circuit of the other field winding 14, and the load in controlling this field winding is also distributed between two sets of contacts 135—136 and 139—140 whereby the same advantages are realized.

It will be clear that an additional current relay could also be added to the form shown in Fig. 7 with its winding in series with the winding 43 of the illustrated current relay, and the armature of this additional current relay could be arranged to directly operate the contact 139 and thereby control the energization of the field winding 14 in the same manner that the illustrated current relay controls the energization of the winding 13. However, it is believed that such an additional current relay will not ordinarily be necessary inasmuch as it has been found that a reduction in the field strength provided by the insertion of the resistances 71 and 72 in field winding 13 will sufficiently reduce the generator output current to protect the apparatus in instances where the voltage does not become sufficient to attract the armatures 30 and 134 of the voltage relays.

A further simplified regulating system for the higher capacity generator having multiple field windings is shown in Fig. 8. This arrangement employs only one voltage and one current relay as in Fig. 3 and these relays are shown in Fig. 8 as being provided with the mechanical coacting devices 62 and 63 shown in Fig. 2. The field winding 13 in this arrangement is energized over a circuit including wire 155, resistance 156, and wire 73, but normally the resistance 156 is shunted by a circuit including wire 157, contacts 37—36, and wires 78 and 79. The field winding 14 is energized over a similar circuit including wire 159, resistance 160, and wires 161 and 73, but normally the resistance 160 is shunted by a circuit including wire 162, contacts 52—51, and wire 163.

When the generator voltage becomes excessive in the system shown in Fig. 8, armature 30 is attracted to open contacts 36—37 as well as contacts 51—52 through extension 62 to open the shunt circuits around resistances 156 and 160 and reduce the current in both field windings 13 and 14 to the predetermined low value. These two sets of contacts may be opened simultaneously or sequentially as desired, and it will be clear that the total load in reducing the generator field current is divided between the two sets of contacts so that neither set is overloaded. Likewise when the output current of the generator becomes excessive without an excessive voltage, armature 45 is attracted to open contacts 51—52 as well as contacts 36—37 through extension 63, thereby reducing the field strength in the same manner.

The regulating system shown in Fig. 9 is substantially the same as that shown in Fig. 8 except that the voltage relay is provided with the additional winding 125 shown in Fig. 6. This winding 125 is shown in Fig. 9 as connected in series with the shunt circuit around resistance 156 by wires 126 and 127, and the winding in this instance is so arranged that current in this shunt circuit produces magnetomotive force opposing the magnetomotive force produced by current in winding 27. The winding 27 may in this arrangement have a greater number of ampere turns than in Fig. 8 so that normally with contacts 36—37 and 51—52 closed, the effect of winding 125 will be offset and armature 30 will be attracted when the generator voltage reaches the same value as in the form shown in Fig. 8.

In the system shown in Fig. 9, adjustments should be made so that contacts 36—37 open before contacts 51—52 to deenergize winding 125 and allow the full effect of winding 27 to be effective on armature 30. In this manner, an added force may be applied by armature 30 in order to insure quick and positive opening of contacts 51—52.

In the systems shown in Figs. 8 and 9, it will be clear that if the two field windings 13 and 14 are substantially the same, the resistances 156 and 160 may be equal the current interrupted by contacts 36—37 and 51—52 will be equal and about one-half the current interrupted by the usual regulating systems with a single resistance for controlling the energization of a single field winding. The heat loss at the contacts is proportional to the square of this current and accordingly the present systems reduce the load or heat loss at the contacts to less than one-fourth that in conventional systems now in use.

In each of the several different illustrated forms of the present invention, it will be clear that the resistance provided for limiting the field current for purposes of generator regulation is divided into a plurality of sections or separate resistances with a plurality of sets of contacts for shunting different sections or different combinations of the separate resistances. In this manner, the contact load in reducing the field current is distributed or apportioned between a plurality of sets of contacts so that the arcing and heating of each set of contacts is reduced to a point which greatly increases the effective life of the contact surfaces. In the forms shown in Figs. 3, 5, 6, 8 and 9, this advantage is realized by using the same number of contacts as is ordinarily required when a single current limiting resistance is shunted by series contacts on the voltage and current relays. This is accomplished by connecting one portion of the total current limiting resistance across the contacts of the voltage relay and the other portion across the contacts of the current relay with interconnecting mechanical means whereby the operation of the armature of one of the relays causes operation of its own contact as well as the contact of the other relay either simultaneously or sequentially. In the form shown in Fig. 2, this mechanical interconnecting means is eliminated by a double set of contacts on both the voltage and current relays wherein one set on each relay is arranged in series in a shunt circuit around each section of the divided resistance.

Another feature of the present invention is the provision of the resistance 90 in the circuit so that the energy stored in the generator field is dissipated upon opening of the regulator contacts by this resistance in combination with the other current limiting resistances, and yet the current through this resistance 90 does not add to the current controlled by the regulator contacts. In this manner, the life of the contacts is further increased by this reduction in the current which ordinarily passes therethrough.

It is to be understood that various changes may be made in the specific construction shown, and certain features thereof may be employed without others, without departing from the present invention as it is defined in the accompanying claims.

The invention claimed is:

1. In a regulating system for a generator having field windings, the combination of circuit means for energizing said field windings including a plurality of resistances, an electromagnetic device responsive to the voltage of said generator, an electromagnetic device responsive to the current supplied by said generator, a plurality of sets of contacts operated by said electromagnetic devices, and means for varying the energization of said field windings comprising shunt circuits for all of said resistances including a plurality of said sets of contacts all operable by one of said electromagnetic devices and a shunt circuit for one only of said resistances including a set of said contacts operated by at least one of said electromagnetic devices.

2. In a regulating system for a generator having field windings, the combination of circuit means for energizing said field windings including a plurality of resistances, a first electromagnetic device responsive to the voltage of said generator, a second electromagnetic device responsive to the current supplied by said generator, a plurality of sets of contacts operated by said electromagnetic devices, and means for varying the energization of said field windings comprising shunt circuits for all of said resistances including a plurality of said sets of contacts all operable by said first electromagnetic device and a shunt circuit for one only of said resistances including a set of said contacts operated by said second electromagnetic devices.

3. In a regulating system for a generator having shunt field windings, the combination of circuit means for energizing said field windings including two current limiting resistances, a first electromagnetic device connected with said generator and having a tractive armature arranged to operate only when the voltage of the generator exceeds a predetermined value, a second electromagnetic device also connected with said generator and having a tractive armature arranged to operate only when the output current of the generator exceeds a predetermined value, a plurality of sets of normally closed contacts arranged to be opened by operation of the armatures of said electromagnetic devices, and means for varying the energization of said field windings comprising shunt circuits for both of said resistances including two of said sets of contacts both opened by the armature of said first electromagnetic device and a shunt circuit for one only of said resistances including one of said sets of contacts opened by the armature of said second electromagnetic device.

4. In a regulating system for a generator having shunt field windings, the combination of circuit means for energizing said field windings including a plurality of current limiting resistances, electromagnetic means connected with said generator and having a tractive armature arranged to be attracted only when the voltage of the generator exceeds a predetermined value, electromagnetic means connected with said generator and having a tractive armature arranged to be attracted only when the current supplied by the generator exceeds a predetermined value, a plurality of sets of normally closed contacts, one set being arranged to be opened by attraction of the armature of either of said electromagnetic means and another set being arranged to be opened by attraction of the armature of one of the electromagnetic means, and means for varying the energization of said field windings comprising shunt circuits around each of said resistances, each shunt circuit including one of said sets of contacts.

5. In a regulating system for a generator having shunt field windings, the combination of circuit means for energizing said field windings including a plurality of current limiting resistances, a first electromagnetic means connected with said generator and having a tractive armature arranged to be attracted only when the voltage of the generator exceeds a predetermined value, a second electromagnetic means connected with said generator and having a tractive armature arranged to be attracted only when the current supplied by the generator exceeds a predetermined value, a plurality of sets of normally closed contacts, one set being arranged to be opened by attraction of the armature of either said first or said second electromagnetic means and another set being arranged to be opened by attraction of the armature of said first electromagnetic means, and means for varying the energization of said field windings comprising shunt circuits around each of said resistances, eaach shunt circuit including one of said sets of contacts.

6. In a regulating system for a generator having shunt field windings, the combination of an energizing circuit for said field windings including two current limiting resistances in series, a first electromagnetic means responsive to excess voltage of said generator, a second electromagnetic means responsive to excess current supplied by said generator, contact means including a set of contacts operated by either said second electromagnetic means or said first electromagnetic means and a set of contacts operated only by said first electromagnetic means, and means for varying the energization of said field windings comprising a shunt circuit around one of said resistances including one of said sets of contacts and a shunt circuit around the other of said resistances including the other of said sets of contacts.

7. In a regulating system for a generator having shunt field windings, the combination of an energizing circuit for said field windings including two current limiting resistances in series, a first electromagnetic means having an armature responsive to excess voltage of said generator, a second electromagnetic means having an armature responsive to excess current supplied by said generator, contact means including a set of normally closed contacts operated by either the armature of said second electromagnetic means or the armature of said first electromagnetic means and a set of contacts operated only by the armature of said first electromagnetic means, and means for varying the energization of said field windings comprising a shunt circuit around one of said resistances including one of said sets of contacts and a shunt circuit around the other of said resistances including the other of said sets of contacts.

8. In a regulating system for a generator having shunt field windings, the combination of an energizing circuit for said field windings including two current limiting resistances in series and a set of normally closed contacts shunting each of said resistances, an electromagnetic device having an armature responsive to excess voltage of said generator and adapted to open both of said sets of contacts, and an electromagnetic device having an armature responsive to excess current supplied by said generator and adapted to open one of said sets of contacts.

9. In a regulating system for a generator having shunt field windings, the combination of circuit means for energizing said field windings including a plurality of current limiting resistances and a set of normally closed contacts shunting each of said resistances, an electromagnetic device including a winding connected in multiple with said generator and a winding connected in series with the circuit means for energizing said field windings for attracting an armature adapted to open both of said sets of contacts, and an electromagnetic device having an armature responsive to excess current supplied by said generator and adapted to open one of said sets of contacts.

10. In a regulating system for a generator having field windings, the combination of circuit means for energizing said field windings including a plurality of current limiting resistances and a set of normally closed contacts shunting each of said resistances, electromagnetic means having windings connected in multiple with said generator and differentially opposed windings connected in series with said circuit means for energizing said field, said electromagnetic means being arranged to open all of said sets of contacts, and electromagnetic means having windings in series with the output circuit of said generator and arranged to open one of said sets of contacts.

11. In a regulating system for a generator having a plurality of multiple field windings, the combination of an energizing circuit for each of said multiple field windings including current limiting resistance shunted by normally closed contacts, electromagnetic means having a first armature responsive to the voltage of said generator for opening all of said contacts, and electromagnetic means having a second armature operable independently of said first armature in response to the output current of said generator for also opening all of said contacts.

12. In a regulating system for a generator having a plurality of multiple field windings, the combination of an energizing circuit for one of said field windings including a resistance shunted by normally closed contacts, an energizing circuit for another of said field windings including a resistance shunted by normally closed contacts, electromagnetic means having an armature responsive to the voltage of said generator for opening all of said contacts, and electromagnetic means having an independently operable armature responsive to the output current of said generator for also opening all of said contacts.

13. In a regulating system for a generator having a plurality of field windings, the combination of an energizing circuit for each of said field windings including resistance part of which is shunted by one set of normally closed contacts and another part by another set of normally closed contacts, electromagnetic means for opening both of said sets of contacts associated with one of said field windings in response to excess generator voltage, electromagnetic means for opening both of said sets of contacts associated with another of said field windings in response to excess generator voltage, and electromagnetic means for opening both of said sets of contacts associated with one of said field windings in response to excess generator current.

14. In a regulating system for a generator having field windings, circuit means for energizing said field windings including a plurality of resistances, each resistance being shunted by two sets of normally closed contacts arranged in series, electromagnetic means responsive to the voltage of said generator for opening one of said sets of contacts associated with each of said resistances, and electromagnetic means responsive to the current supplied by said generator for opening the other of said sets of contacts associated with each resistance.

15. In a regulating system for a generator having field windings, circuit means for energizing said field windings including series resistance shunted by a second resistance in series with a first set of normally closed contacts, a second set of normally closed contacts shunting said second resistance, electromagnetic means responsive to the voltage of said generator for consecutively opening said second and said first sets of contacts, and electromagnetic means responsive to the current supplied by said generator for opening said second set of contacts.

16. In a regulating system for a generator having a plurality of multiple field windings, the combination of an energizing circuit for one of said field windings including a resistance shunted by a first set of normally closed contacts, an energizing circuit for another of said field windings including a resistance shunted by a second set of normally closed contacts, an electromagnetic device responsive to excess current supplied by said generator for opening said first set of contacts, and an electromagnetic device having an armature arranged to consecutively open said first and said second sets of contacts and having windings connected in multiple with said generator and differentially opposed windings connected in series with said first set of contacts in the shunt circuit around the associated resistance.

RUSSELL G. THOMPSON.